(12) United States Patent
Kim

(10) Patent No.: US 7,434,979 B2
(45) Date of Patent: Oct. 14, 2008

(54) BACKLIGHT ASSEMBLY AND LIQUID CRYSTAL DISPLAY APPARATUS HAVING THE SAME

(75) Inventor: Yong-Il Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/685,410

(22) Filed: Mar. 13, 2007

(65) Prior Publication Data

US 2007/0195554 A1  Aug. 23, 2007

Related U.S. Application Data

(63) Continuation of application No. 10/600,194, filed on Jun. 19, 2003, now Pat. No. 7,207,710.

(30) Foreign Application Priority Data

Feb. 12, 2003 (KR) .................... 2003-8696

(51) Int. Cl.
*F21S 4/00* (2006.01)
(52) U.S. Cl. ....................... 362/634; 362/225
(58) Field of Classification Search ......... 362/632–634, 362/225, 97, 396
See application file for complete search history.

(56) References Cited

U.S. PATENT DOCUMENTS

| 6,217,190 B1 * | 4/2001 | Altman et al. | 362/221 |
| 6,796,678 B2 * | 9/2004 | Moon | 362/225 |
| 6,905,224 B2 * | 6/2005 | Yoo et al. | 362/225 |

FOREIGN PATENT DOCUMENTS

CN  1379274  11/2002

OTHER PUBLICATIONS

Chinese Office Action Jun. 22, 2007. All references cited in the Office action and not previously submitted are listed above.

* cited by examiner

*Primary Examiner*—Ali Alavi
(74) *Attorney, Agent, or Firm*—Cantor Colburn LLP

(57) ABSTRACT

In a backlight assembly and an LCD apparatus having the same, a lamp-fixing member includes a base substrate, a fixing clip protruded from a base substrate so as to fix a lamp and a fixing portion formed by partially cutting-away the base substrate. A mold frame includes a receiving portion for receiving the lamp-fixing member and the receiving portion includes a fixing protrusion inserted into the fixing portion. The fixing protrusion includes a supporting portion formed at an end of the fixing protrusion and coupled to the base substrate when the lamp-fixing member is slid. Accordingly, the backlight assembly may have an improved light efficiency and an enhanced assemblability.

8 Claims, 9 Drawing Sheets

BACKLIGHT ASSEMBLY AND LIQUID CRYSTAL DISPLAY APPARATUS HAVING THE SAME

CROSS-REFERENCE TO RELATED APPLICATIONS

This application is a continuation application of U.S. application Ser. No. 10/600,194 filed Jun. 19, 2003, which claims priority to and the benefit of Korean Patent Application No. 2003-8696 filed on Feb. 12, 2003, all of which are herein incorporated by reference in their entirety.

BACKGROUND OF THE INVENTION

1. Field of the Invention

The present invention relates to a backlight assembly an LCD (Liquid Crystal Display) apparatus, and more particularly to a backlight assembly and an LCD apparatus having an improved light efficiency and an enhanced assemblability.

2. Description of the Related Art

An LCD apparatus includes an LCD panel for displaying an image and a backlight assembly for providing a light to the LCD panel.

Recently, an LCD apparatus has been gradually scaled up in accordance with demand of customers, so that the scaling-up of the LCD apparatus has accommodated an LCD panel and a backlight assembly to be scaled up to the demand of the customers. As a result, an LCD apparatus has employed a direct illumination type backlight assembly having a plurality of lamps disposed under the LCD panel. The plurality of lamps arranged in parallel to each other directly provides a light to the LCD panel.

A direct illumination type backlight assembly, generally, uses an EEFL (External Electrode Fluorescent Lamp). An EEFL includes a tube body into which a discharge gas is injected and an external electrode outwardly positioned at both ends of the tube body. The EEFL generates a light in response to a lamp driving voltage provided from an external device through the external electrode. The direct illumination type backlight assembly having the EEFL further includes a lamp-fixing member and a mold frame for receiving the lamp-fixing member and the EEFL.

The lamp-fixing member is coupled to the mold frame so as to fix the EEFL to a predetermined position. Also, the lamp-fixing member is electrically connected to the EEFL so that the lamp driving voltage is provided to the EEFL.

Accordingly, if the lamp-fixing member is not normally coupled to the mold frame, the EEFL received into the lamp-fixing member may be easily moved by an impact from an exterior, thereby deteriorating an assemblability of the direct illumination type backlight assembly.

Also, when the EEFL is moved, an effective light-emitting area of the EEFL does not correspond to a display area of an LCD apparatus having the direct illumination type backlight assembly, so a light efficiency of the direct illumination type backlight assembly and a display quality of the LCD apparatus may be deteriorated.

BRIEF SUMMARY OF THE INVENTION

The present invention provides a backlight assembly having an improved light efficiency and an enhanced assemblability.

The present invention provides an LCD having the above backlight assembly.

In one aspect of the invention, a backlight assembly includes a lamp for generating light, a fixing member for fixing the lamp and a receiving receptacle for receiving the lamp and fixing member.

The fixing member includes a base substrate, a fixing clip protruded from an upper surface of the base substrate so as to fix the lamp and a first fixing portion formed by partially cutting-away the base substrate.

The receiving receptacle provides a receiving space in which the fixing member is received and includes a first fixing protrusion inserted into the first fixing portion, which is protruded from a bottom surface of the receiving space, so as to prevent deviation of the fixing member from the receiving space.

In another aspect of the invention, an LCD apparatus includes an LCD panel for receiving light provided from an external and displaying an image, a lamp for generating the light, a fixing member for fixing the lamp and a receiving receptacle for receiving the lamp and fixing member.

The fixing member includes a base substrate, a fixing clip protruded from an upper surface of the base substrate so as to fix the lamp and a first fixing portion formed by partially cutting-away the base substrate.

The receiving receptacle provides a receiving space in which the fixing member is received and includes a first fixing protrusion inserted into the first fixing portion, which is protruded from a bottom surface of the receiving space, so as to prevent deviation of the fixing member from the receiving space.

Accordingly, the lamp-fixing member coupled to the mold frame is not deviated from the backlight assembly although an external impact is applied to the backlight assembly, thereby improving assemblability of the backlight assembly.

Also, since the lamps can be stably fixed to the lamp-fixing member, the brightness of the light generated from the backlight assembly may be increased and a display quality of the LCD apparatus may be improved.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1A:
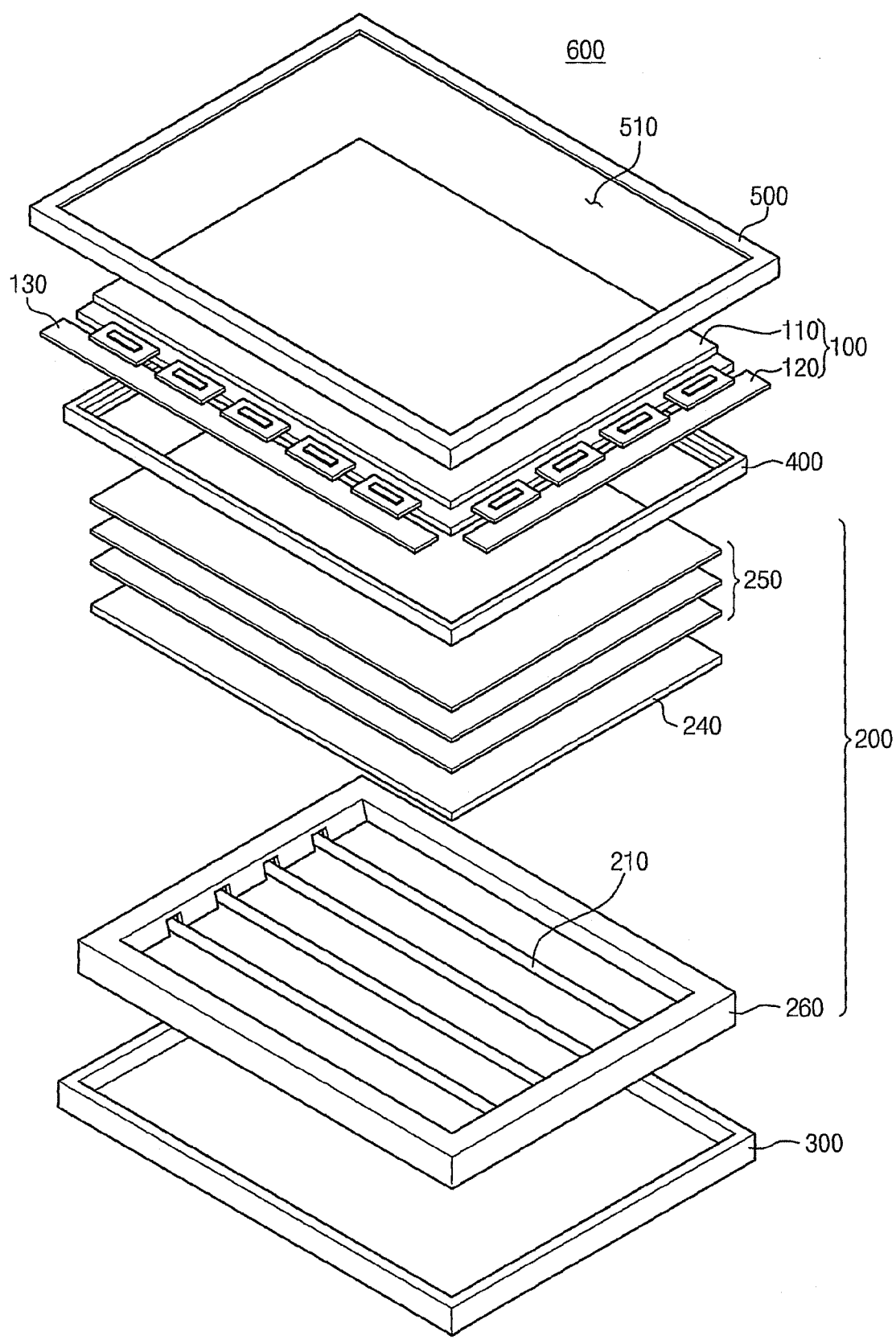
FIG. 1A is an exploded perspective view showing an LCD apparatus according to an exemplary embodiment of the present invention.
Figure 1B:
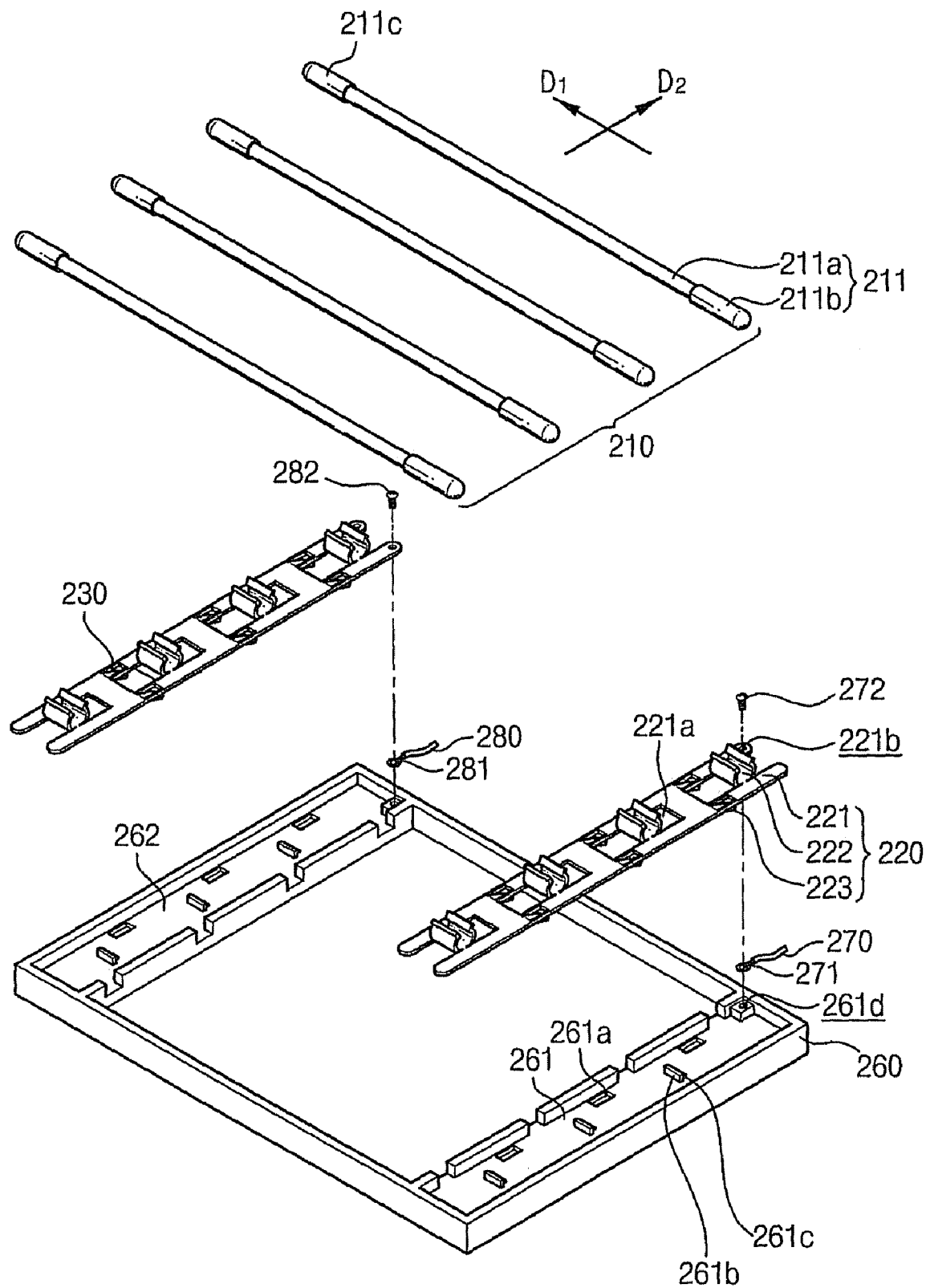
FIG. 1B is an exploded perspective view showing a backlight assembly shown in FIG. 1A.

FIG. 1A is an exploded perspective view showing an LCD apparatus according to an exemplary embodiment of the present invention. FIG. 1B is an exploded perspective view showing a backlight assembly shown in FIG. 1A.

Referring to FIGS. 1A and 1B, an LCD apparatus 600 according to an exemplary embodiment of the present invention includes a display unit 100 for displaying an image and a backlight assembly 200 for providing a light to the display unit 100.

The display unit 100 includes an LCD panel 110 for displaying the image and gate and data PCBs (Printed Circuit Boards) 120 and 130 for driving the LCD panel 110.

The backlight assembly 200 includes a lamp unit 210 having a plurality of lamps 211 for generating the light, first and second lamp-fixing members 220 and 230 for guiding positions of the lamps 211, a diffusing plate 240 for diffusing the light, optical sheets 250 for improving optical properties of the light, which are disposed on the diffusing plate 240 and a mold frame 260 for receiving the optical sheets 250, diffusing plate 240, lamp unit 210, and first and second lamp-fixing members 220 and 230.

The lamps 211 are extended in a first direction D1 and arranged in a second direction D2 perpendicular to the first direction D1. Each of the lamps 211 includes a tube body 211a, first and second external electrodes 211b and 211c respectively positioned at both ends of the tube body 211a and a discharge gas (not shown) injected into the tube body 211a.

The first and second external electrodes 211b and 211c includes a metal material and outwardly surrounds the both ends of the tube body 211a. Also, the first and second external electrodes 211b and 211c receives a lamp driving voltage supplied from an external device (not shown), for example, such as a power supply device, and provides the lamp driving voltage to the tube body 211a.

The first lamp-fixing member 220 receives first ends of the lamps 211 and is fixed to the mold frame 260. The second lamp-fixing member 230 receives second ends of the lamps 211 and is fixed to the mold frame 260. Thus, the lamps 211 may be fixed to a predetermined position of the mold frame 260.

The mold frame 260 provides a receiving space in which the lamp unit 210, diffusing plate 240, optical sheets 250, first lamp-fixing member 220 and second lamp-fixing member 230 are received. For this purpose, the mold frame 260 includes a sidewall, a first receiving portion 261 extended from the sidewall so as to receive the first lamp-fixing member 220 and a second receiving portion 262 extended from the sidewall so as to receive the second lamp-fixing member 230.

In this exemplary embodiment, the first lamp-fixing member 220 includes the function and structure as in those of the second lamp-fixing member 230 as shown in FIG. 1B. Therefore, the structure of the first lamp-fixing member 220 will be described in detail and the detailed description of the second lamp-fixing member 230 will be omitted.

The first lamp-fixing member 220 includes fixing clips 222 coupled to the first external electrodes 211b positioned at the first ends of the lamps 211 and is fixed to the first receiving portion 261 of the mold frame 260. The second lamp-fixing member 230 also includes fixing clips coupled to the second external electrodes 211c positioned at the second ends of the lamps 211 and is fixed to the second receiving portion 262 of the mold frame 260.

The first lamp-fixing member 220 includes a base substrate 221, the fixing clips 222 protruded from the base substrate 221 so as to receive the first ends of the lamps 210 and a first fixing portion 221a formed by partially cutting-way the base substrate 221 and coupled to a fixing protrusion (not shown) formed on the mold frame 260.

The mold frame 260 includes a first receiving portion 261 for receiving the first lamp-fixing member 220 and the first receiving portion 261 includes a first fixing protrusion 261b protruded from an upper surface of the first receiving portion 261. The first fixing protrusion 261b is provided with a supporting portion 261c protruded from an upper end of the first fixing protrusion 261b to a direction perpendicular to a direction to which the first fixing protrusion 261b is protruded. The supporting portion 261c fixes the first lamp-fixing member 220 to the first receiving portion 261, thereby preventing deviation of the first lamp-fixing member 220 from the first receiving portion 261.

Also, the first lamp-fixing member 220 further includes a second fixing protrusion 223 protruded from a lower surface of the base substrate 220 to the upper surface of the first receiving portion 261. Particularly, the second fixing protrusion 223 is formed by partially cutting the base substrate 220 and inclined toward the upper surface of the first receiving portion 261.

When the first and second lamp-fixing members 220 and 230 are received into the first and second receiving portions 261 and 262 of the mold frame 260, respectively, the first and second lamp-fixing members 220 and 230 are fixed to the first and second receiving portions 261 and 262 in a hook-type manner.

The first and second lamp-fixing members 220 and 230 receives the lamp driving voltage from the external device (not shown) and provides the lamp driving voltage to the lamps 211 through the first and second external electrodes 211b and 211c so as to drive the lamps 211. In order to apply the lamp driving voltage to the first and second lamp-fixing members 220 and 230, the external device (not shown) includes first and second electric wires 270 and 280. The first and second electric wires 270 and 280 include a ring-shaped end portion at which first thru-holes 271 and 281 are formed, respectively. The first thru-holes 271 and 281 have a size corresponding to a size of first and second screws 272 and 282 respectively engaged to the first and second receiving portions 261 and 262 passing through the first thru-holes 271 and 281.

In order to drive the lamps 211, the external device (not shown) provides the lamp driving voltage to the first and second lamp-fixing members 220 and 230 through the first and second electric wires 270 and 280. One of the first and second lamp-fixing members 220 and 230 receives a high level voltage from the external device and the other of the first and second lamp-fixing members 220 and 230 receives a low level voltage, for example, such as a ground voltage from the external device. If the second lamp-fixing member 230 is not electrically connected to the external device using the second electric wire 280, the second lamp-fixing member 230 is connected to a ground using a separate electric wire (not shown).

In FIG. 1B, the first lamp-fixing member 220 includes the same structure as in that of the second lamp-fixing member 230, so that the structure of the first lamp-fixing member 220 will be described in detail and the detailed description of the second lamp-fixing member 230 will be omitted.

The first lamp-fixing member 220 is provided with a second thru-hole 221b corresponding to the first thru-hole 271 of the first electric wire 270 and the mold frame 260 is provided with an engaging recess 261d corresponding to the first and second thru-holes 271 and 221b. When the first lamp-fixing member 220 is received into the first receiving portion 261 of the mold frame 260, the first screw 272 is engaged into the engaging recess 261d, which is sequentially passing through the second and first thru-holes 221b and 271. Thus, the first lamp-fixing member 220 and first electric wire 270 are electrically connected to each other by means of the first screw 272, so that the first lamp-fixing member 220 may receive the lamp driving voltage provided from the external device.

The lamps 211 are fixed to the first and second lamp-fixing members 220 and 230. The first and second lamp-fixing members 220 and 230 include a metal material and are electrically connected to the first and second external electrodes 211b and 211c, respectively. Accordingly, the lamp driving voltage provided from the external device is provided to the first and second external electrodes 211b and 211c through the first and second, lamp-fixing members 220 and 230.

The first and second lamp-fixing members 220 and 230 may fix the lamps 211 received into the mold frame 260 to predetermined positions and apply the lamp driving voltage to the lamps 211. The mold frame 260 is received into a bottom chassis 300.

The diffusing plate 240 and optical sheets 250 is sequentially disposed on the mold frame 260 and a middle chassis 400 is disposed on the optical sheets 250. The LCD panel 110 is fixed to the middle chassis 400 by means of a top chassis 500 disposed on the LCD panel 110 and combined with the bottom chassis 300. The top chassis 500 is provided with an opening 510 so as to expose an effective display area of the LCD panel 110.

Figure 2:
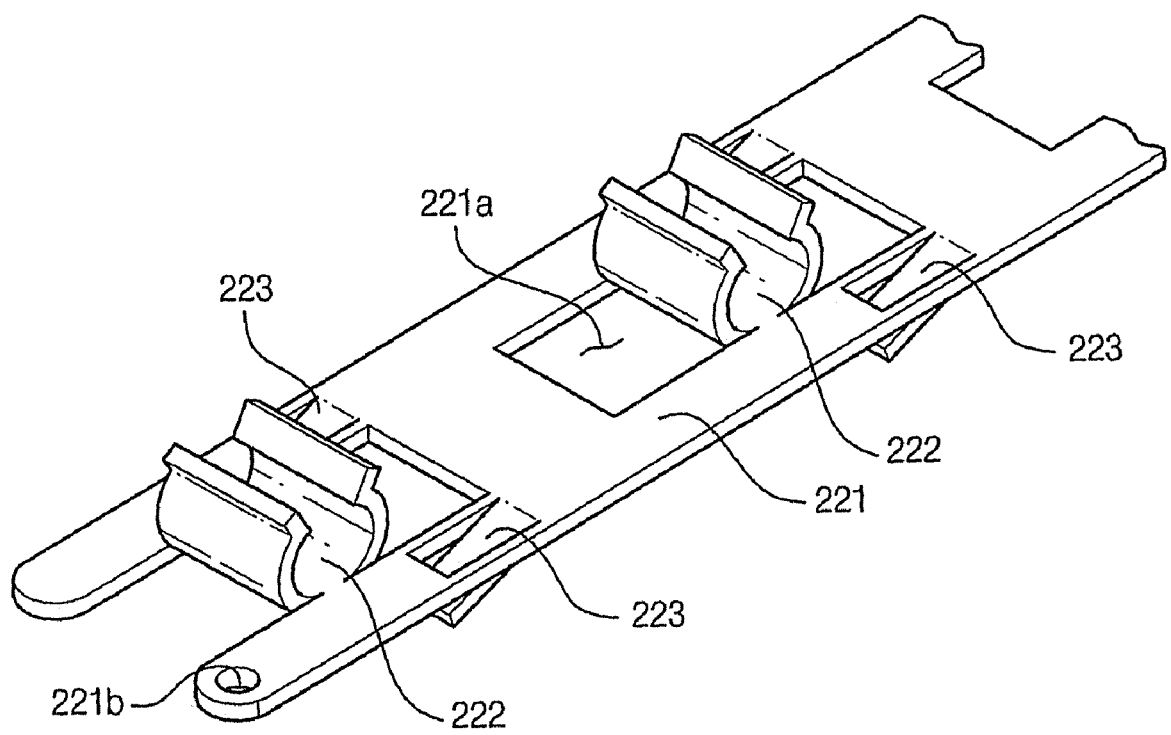
FIG. 2 is a perspective view showing a first lamp-fixing member shown in FIG. 1B.
Figure 3:
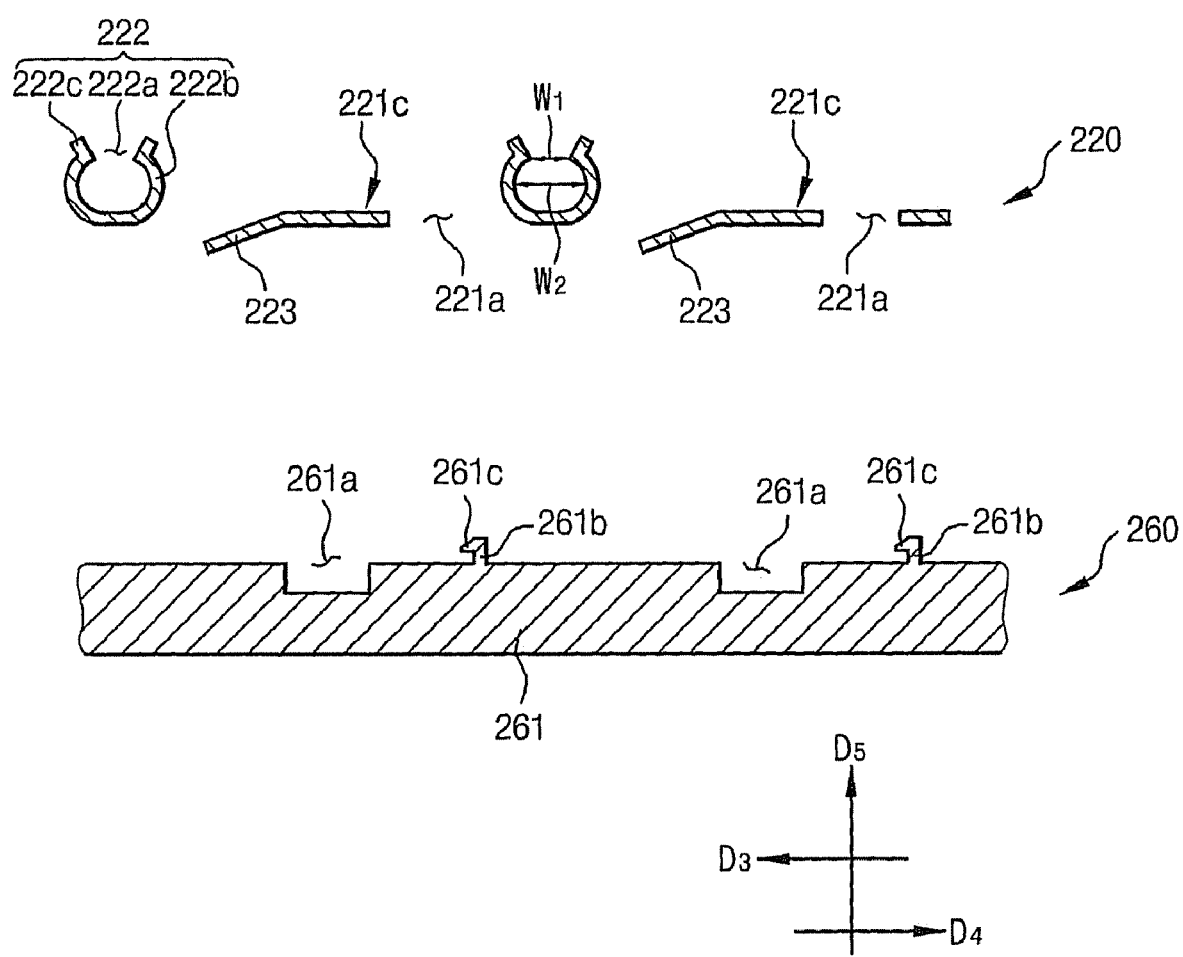
FIGS. 3 to 7 are schematic views showing a first lamp-fixing member in assembled relation with a mold frame shown FIGS. 2 and 1B, respectively.

FIG. 2 is a perspective view showing a first lamp-fixing member 220 shown in FIG. 1B, and FIG. 3 is a schematic view showing a first lamp-fixing member 220 in assembled relation with a mold frame 260 shown FIGS. 2 and 1B, respectively.

Referring to FIGS. 2 and 3, the first lamp-fixing member 220 includes the base substrate 221, fixing clips 222 protruded from the base substrate 221 so as to fix the lamps 211 and first fixing portion 221a formed by partially cutting-away the base substrate 221 and coupled to the first fixing protrusion 261b formed at the mold frame 260.

The mold frame 260 includes the first receiving portion 261 for receiving the first lamp-fixing member 220 and the first receiving portion 261 includes the first fixing protrusion 261b protruded from the upper surface of the first receiving portion 261.

The first fixing protrusion 261b is provided with the supporting portion 261c protruded from the upper end of the first fixing protrusion 261b to a direction perpendicular to a direction to which the first fixing protrusion 261b is protruded. The supporting portion 261c fixes the first lamp-fixing member 220 to the first receiving portion 261, thereby preventing deviation of the first lamp-fixing member 220 from the first receiving portion 261.

Since the first fixing protrusion 261b includes the supporting portion 261c, the first lamp-fixing member 220 is coupled to the first receiving portion 261 in a sliding manner after the first lamp-fixing member 220 is received into the first receiving portion 261. As shown in FIG. 3, in case that the supporting portion 261c is protruded in a third direction D3, the first lamp-fixing member 220 is received into the first receiving portion 261 so as to allow the supporting portion 261c to pass through the first fixing portion 221a and the first lamp-fixing member 220 is slid on the upper surface of the first receiving portion 261 in a fourth direction D4 opposite to the third direction D3.

When the first lamp-fixing member 220 is moved in the fourth direction D4, the supporting portion 261c makes contact with the upper surface of the base substrate 221 of the first lamp-fixing member 220. Thus, the first fixing protrusion 261b fixes the first lamp-fixing member 220 so that the first lamp-fixing member 220 is not moved to a fifth direction D5.

However, although the first lamp-fixing member 220 is not moved to the fifth direction D5 by means of the supporting portion 261c, the first lamp-fixing member 220 needs a structure that may prevent movement of the first lamp-fixing member 220 to the third and fourth directions D3 and D4. That is, the first lamp-fixing member 220 may be easily moved to the third direction D3 by an external impact because the first lamp-fixing member 220 is moved to the fourth direction D4.

Accordingly, the first lamp-fixing member 220 further includes the second fixing protrusion 223 protruded from the base substrate 220 to the upper surface of the first receiving portion 261. The second fixing protrusion 223 is formed by partially cutting the base substrate 220 and inclined toward the upper surface of the first receiving portion 261. The lower surface of the second fixing protrusion 223 faces the fourth direction D4.

The mold frame 260 is provided with a second fixing portion 261a formed on the bottom surface of the first receiving portion 261 so as to receive the second fixing protrusion 223. The second fixing portion 261a is formed by partially cutting-away the bottom surface of the first receiving portion 261.

When the first lamp-fixing member 220 is slid on the first receiving portion 261 in the fourth direction D4, the second fixing protrusion 223 is received into the second fixing portion 261a. Thus, the first lamp-fixing member 220 may be fixed to the first receiving portion 261, thereby preventing movement of the first lamp-fixing member 220 to the third direction D3.

The base substrate 221 of the first lamp-fixing member 220 has a plate shape and the second thru-hole 221b is formed at an end of the base substrate 221. The first screw 272 (see FIG. 1B) is engaged into the engaging recess 261d (see FIG. 1B) of the mold frame 260, which is sequentially passing through the second and first thru-holes 221b and 271. Thus, the first lamp-fixing member 220 and first electric wire 270 are electrically connected to each other by means of the first screw 272.

Each of the fixing clips 222 is protruded from the upper surface of the base substrate 221 and coupled to the first ends, at which the first external electrode 211b is positioned of the lamps 211. The fixing clips 222 respectively include an opening 222a that allows the first ends of the lamps 222 to be received in the fixing clips 222 and a guide surface 222b that defines a receiving space having a cylindrical shape in which the first external electrode 211b is received. A width W1 of the opening 222a is smaller than a width W2 of the receiving space and a diameter of the first external electrode 211b.

Although the width W1 of the opening 222a is smaller than the diameter of the first external electrode 211b, since the guide surface 222b has elasticity, the width W1 of the opening 222a is widened by the diameter of the first external electrode 211b while the first external electrode 211b is inserted into the receiving space through the opening 222a. When the first external electrode 211b is completely inserted into the receiving space, the guide surface 222b is returned to an initial state and the width W1 is narrowed.

Thus, the first external electrode 211b inserted into the receiving space may not be deviated from the receiving space through the opening 222a and may be fixed to the first lamp-fixing member 220 by means of the guide surface 222b.

Also, the guide surface 222b is provided with inclined surfaces 222c outwardly extended from both ends of the guide surface 222b. The inclined surfaces 222c allows the first external electrode 221b to be easily inserted into the receiving space through the opening 222a.

Figure 4:
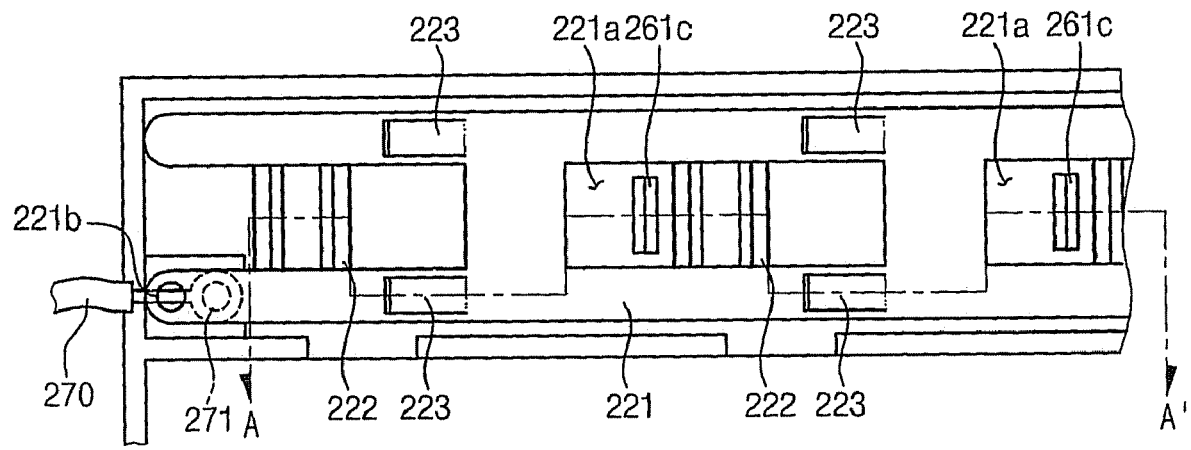
Figure 5:
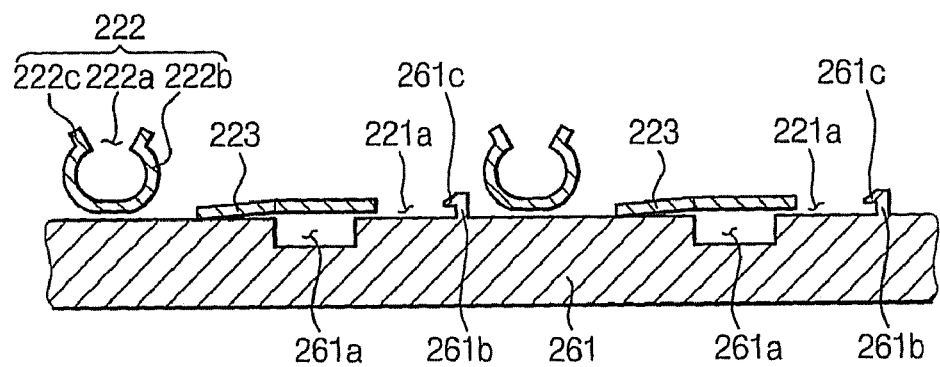
Figure 5:
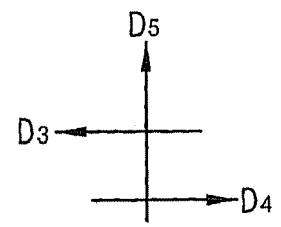

FIG. 4 is a plan view showing a lamp fixing-member disposed on a mold frame and FIG. 5 is a cross-sectional view taken along the line A-A' for showing structure of a lamp fixing-member and a mold frame shown in FIG. 4.

Referring to FIGS. 4 and 5, when the first lamp-fixing member 220 is received in the first receiving portion 261 of the mold frame 260, the first fixing protrusion 261b is inserted into the first fixing portion 221a. In order to insert the first fixing protrusion 261b into the first fixing portion 221a, the first fixing portion 221a has a width appropriate to allow the first fixing-protrusion 261b to be passed the first fixing portion 221a.

The second fixing protrusion 223 of the first lamp fixing-member 220 is positioned on a position of the upper surface of the first lamp fixing-member 220, which is separated from the second fixing portion 261a in a predetermined distance.

That is, since the second fixing protrusion 223 is positioned on the upper surface of the first lamp-fixing member 220 when the first lamp-fixing member 220 is received in the first receiving portion 261, the second fixing protrusion 223 is substantially parallel to the base substrate 221. Thus, the first fixing protrusion 261b of the mold frame 260 may be positioned at a position higher than that of the base substrate 221.

Figure 6:
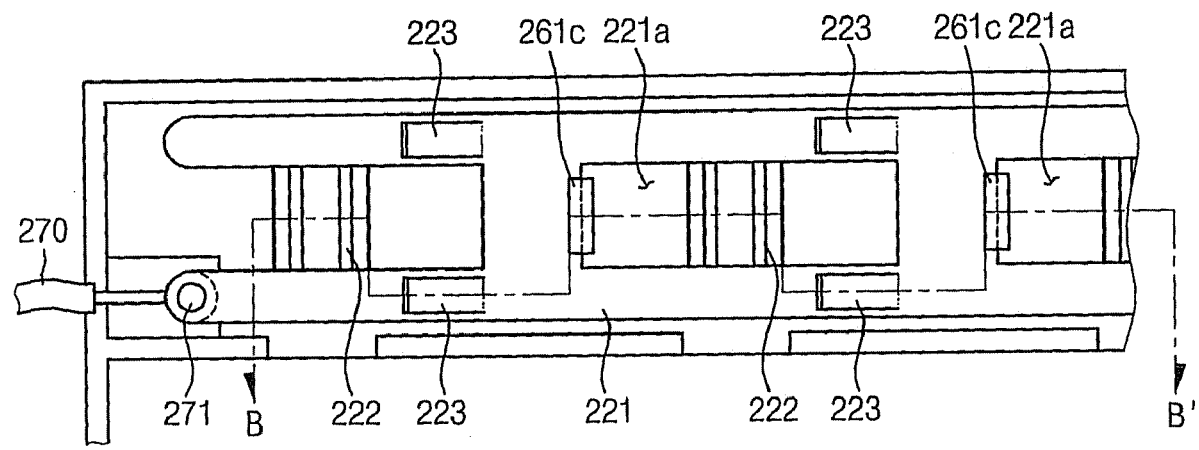
Figure 7:
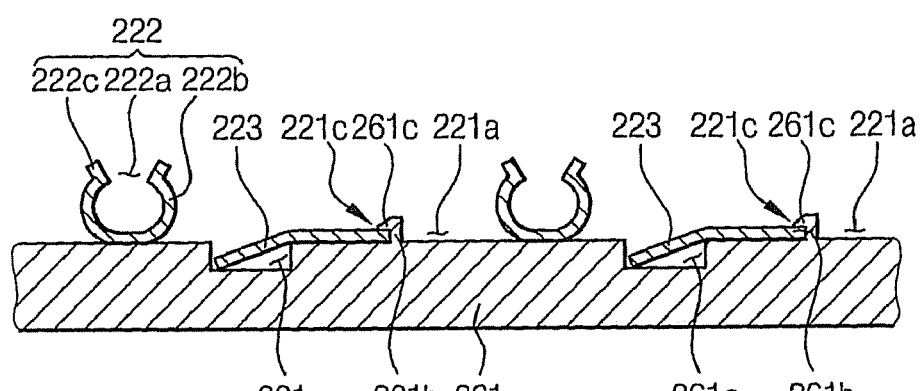
Figure 7:
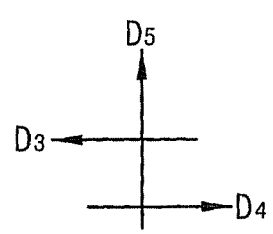

FIG. 6 is a plan view showing a lamp fixing-member fixed to a mold frame and FIG. 7 is a cross-sectional view taken along the line B-B' for showing structure of a lamp fixing-member and a mold frame shown in FIG. 6.

Referring to FIGS. 6 and 7, when the first lamp fixing-member 220 received in the first receiving portion 261 of the mold frame 260 is moved to the fourth direction D4, the supporting portion 261c formed at the end of the first fixing protrusion 261b makes contact with the upper surface of the first lamp-fixing member 220.

Thus, the first lamp-fixing member 220 is fixed to the first receiving portion 261 by means of the supporting portion 261c and the supporting portion prevents the first lamp-fixing member 220 from deviating from the first receiving portion 261 to the fifth direction D5.

In addition, the second fixing-protrusion 223 is formed by partially cutting the base substrate 220 and inclined toward the upper surface of the first receiving portion 261. The lower surface of the second fixing protrusion 223 faces to the fourth direction D4.

When the first lamp-fixing member 220 is moved to the fourth direction D4, the second fixing protrusion 223 is received into the second fixing portion 261a formed on the first receiving portion 261. While the second fixing protrusion is received into the second fixing portion 261a, the second fixing protrusion 223 is returned to an initial state due to an elasticity thereof and positioned at a bottom portion of the second fixing portion 261a. Therefore, the second fixing portion 261a and second fixing protrusion 223 may prevent the first lamp-fixing member 220 from moving in the third direction D3 and the first fixing protrusion 261b and first fixing portion 221a may prevent the first lamp-fixing member 220 from moving in the fourth direction D4.

When the first lamp-fixing member 220 is coupled to the first receiving portion 261, the first screw 272 is engaged into the engaging recess 261d of the first receiving portion 261 after passing through the second thru-hole 221b formed at the base substrate 221 and the first thru-hole 271 formed at the end of the first electric wire 270.

Thus, the first lamp-fixing member 220 is electrically connected to the first electric wire 270 by means of the first screw 272 and the lamp driving voltage from the external device (not shown) is applied to the first lamp-fixing member 220 through the first electric wire 270.

Figure 8:
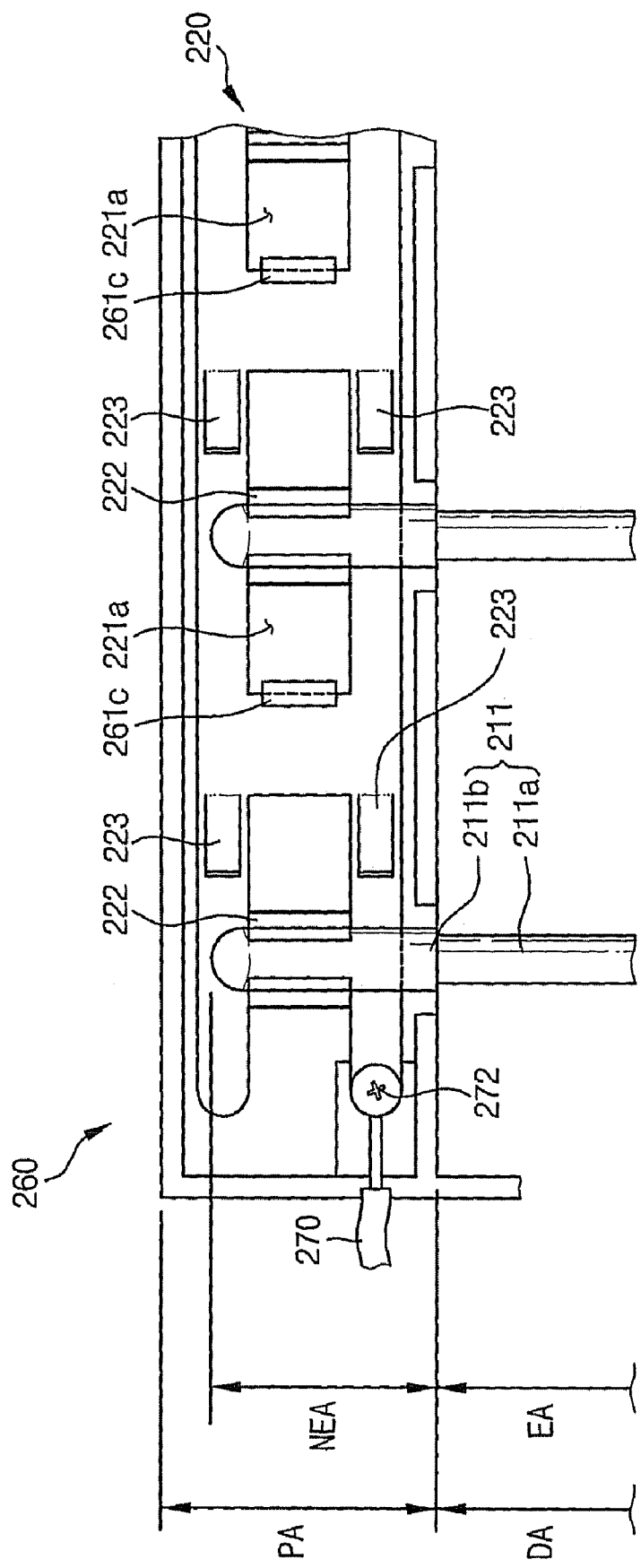
FIG. 8 is a plan view showing a lamp assembled with a first lamp-fixing member.

FIG. 8 is a plan view showing a lamp assembled with a first lamp-fixing member shown in FIG. 1B.

Referring to FIG. 8, the lamps 211 are coupled to the fixing clips 222 of the first lamp-fixing member 220, respectively. Each of the first ends, at which the first external electrode 211b is positioned, of the lamps 211 is received in the receiving space defined by the guide surfaces 222b of the fixing clips 222. The width W1 of the opening 222a is widened by the diameter of the first external electrode 211b while the first external electrode 211b is inserted into the receiving space through the opening 222a since the width W1 of the opening 222a is smaller than the diameter of the first external electrode 211b. When the first external electrode 211b is completely inserted into the receiving space, the guide surface 222b is returned to the initial state due to the elasticity thereof, thereby preventing the lamps 211 from being deviated from the fixing clips 222.

Each of the lamps 211 includes an effective light emitting area EA for emitting the light and a non-effective light emitting area NEA where the light is not emitted. The effective light emitting area EA is corresponding to an area on which the first and second external electrodes 211b and 211c are positioned and the non-effective light emitting area NEA is corresponding to an area on which the first and second external electrodes 211b and 211c are not positioned.

The lamps 211 coupled to the first and second receiving portions 261 and 262 are received into the mold frame 260, which is corresponding to a display area DA of the LCD apparatus 600 (see FIG. 1). That is, if the non-effective light emitting area NEA is located within the display area DA, a brightness characteristic of the image displayed on the LCD apparatus 600 may be deteriorated. Also, if the effective light emitting area EA is partially located within a peripheral area PA adjacent to the display area DA, the light efficiency of the light emitted from the backlight assembly 200 may be deteriorated.

Accordingly, the lamps 211 are disposed such that the non-effective light emitting area NEA is corresponding to the peripheral area PA of the LCD panel 100 and the effective light emitting area EA is corresponding to the display area EA of the LCD panel 100.

Figure 9:
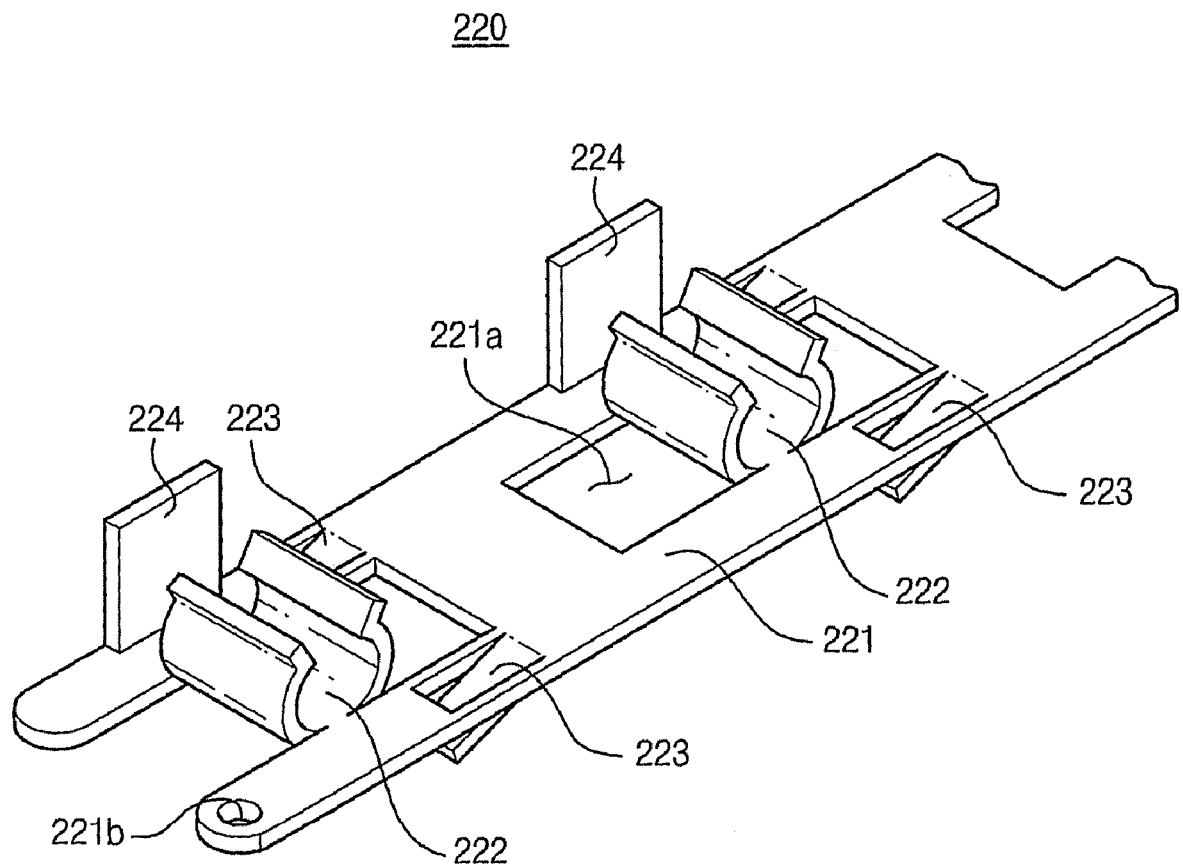
FIG. 9 is a perspective view showing a first lamp-fixing member according to another exemplary embodiment of the present invention.
Figure 10:
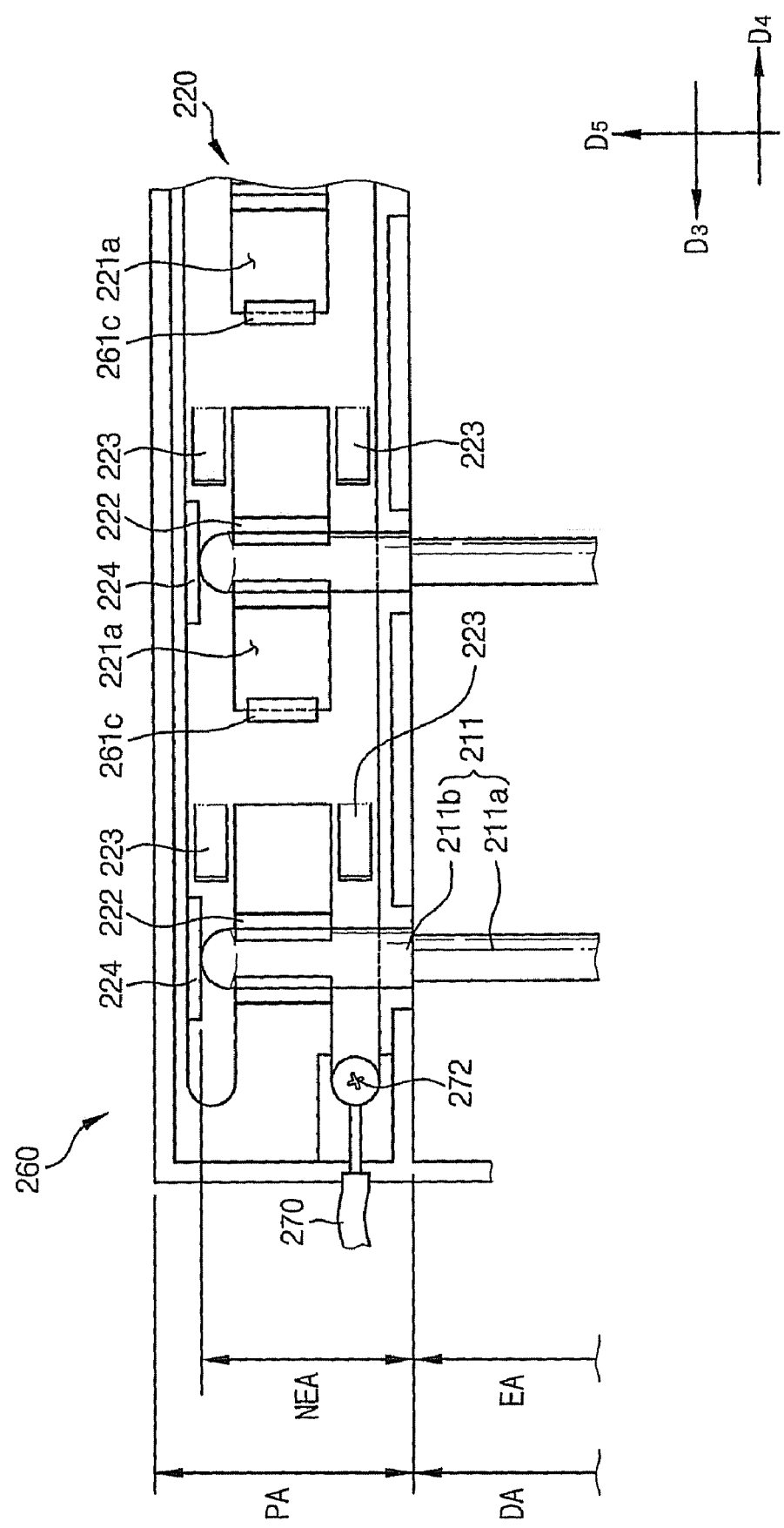
FIG. 10 is a plan view showing a lamp assembled with a first lamp-fixing member shown in FIG. 9.

FIG. 9 is a perspective view showing a first lamp-fixing member according to another exemplary embodiment of the present invention. FIG. 10 is a plan view showing a lamp assembled with a first lamp-fixing member shown in FIG. 9. In FIGS. 9 and 10, parts having the same function and structure as in those of the first lamp-fixing member according to an exemplary embodiment of the present invention will be represented by the same reference numerals as in those of the first lamp-fixing member and will not be described in detail.

Referring to FIGS. 9 and 10, a first lamp-fixing member 220 includes a base substrate 221 and fixing clips 222 protruded from an upper surface of the base substrate 221 so as to receive lamps 211. Also, the first lamp-fixing member 220 further includes a first fixing portion 221a formed by partially cutting-way the base substrate 221, a second fixing protrusion 223 protruded from the base substrate 220 to an upper surface of a first receiving portion 261, and a third fixing protrusion 224 protruded from the base substrate 221 in a direction identical to a direction to which the fixing clips 222 is extended.

The third fixing protrusion 224 is disposed corresponding to the fixing clips 222. When the first ends of the lamps 211 are received into the receiving spaces of the fixing clips 222, respectively, the third fixing protrusion 224 is disposed between the first ends of the lamps 221 and the sidewall of the mold frame 260. Moreover, the third fixing protrusion 224 makes contact with the first ends of the lamps 211 so as to prevent movement of the lamps to the fifth direction D5.

As shown in FIG. 1B, a second lamp-fixing member 230 (not shown in FIGS. 9 and 10) is received into the second receiving portion 262 (not shown in FIGS. 9 and 10) having the same function and structure as in those of the first lamp-fixing member 230. The second lamp-fixing member 230 also includes a fourth fixing protrusion (not shown) having the same function and structure as in those of the third fixing protrusion 224 of the first lamp-fixing member 230.

The third fixing protrusion 224 and fourth fixing protrusion (not shown) may fix the lamps 211 to the fixing clips 222, thereby preventing the non-effective light emitting area NEA of the lamps 222 from moving towards the display area DA. Thus, the brightness of the light generated from the backlight assembly 200 (see FIG. 1) may be increased and a display quality of the LCD apparatus 600 may be improved.

In these exemplary embodiments according to the present invention, in case that the backlight assembly is applied to the LCD apparatus has been described. However, the backlight assembly may be applied to an organic electroluminence device or a plasma display apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
    a lamp generating light;
    a fixing member including a base substrate provided with an aperture extending through the base substrate, and a fixing clip electrically coupled to the base substrate and fixing the lamp; and
    a receiving receptacle providing a receiving space in which the fixing member is received, and including a first fixing protrusion inserted into the aperture of the fixing member and fixing the fixing member in the receiving space;
    wherein the first fixing protrusion is unitary with the receiving receptacle, and is protruded from a surface of the receiving receptacle.

2. The backlight assembly of claim 1, wherein the base substrate comprises a first substrate extended in a first direction and a second substrate separate from the first substrate and disposed parallel the first substrate.

3. The backlight assembly of claim 2, wherein the fixing clip is extended in a second direction substantially perpendicular to the first direction and comprises a first end portion disposed on an upper surface of the first substrate and a second end portion disposed on an upper surface of the second substrate.

4. The backlight assembly of claim 3, wherein the lamp comprises a tube body to generate the light and an external electrode to surround an end portion of the tube body, and the external electrode is coupled to the fixing clip.

5. The backlight assembly of claim 4, wherein an electric wire is electrically connected to the fixing member to provide the external electrode with a voltage driving the lamp.

6. A backlight assembly comprising:
    a lamp to generate light;
    a fixing member fixing the lamp and including:
        a first base substrate extended in a first direction, a second base substrate to parallel the first base substrate, and a fixing clip extended in a second direction substantially perpendicular to the first direction, the fixing clip including a first end portion disposed on an upper surface of the first base substrate and a second end portion disposed on an upper surface of the second base substrate; and
    a receiving receptacle receiving the lamp and the fixing member.

7. The backlight assembly of claim 6, wherein the lamp comprises a tube body to generate the light and an external electrode to surround an end portion of the tube body, and the external electrode is coupled to the fixing clip.

8. The backlight assembly of claim 7, wherein an electric wire is electrically connected to the fixing member to provide the external electrode with a voltage driving the lamp.

* * * * *